(12) United States Patent
Horng

(10) Patent No.: US 8,835,017 B2
(45) Date of Patent: *Sep. 16, 2014

(54) METAL SHEET MEMBER HAVING HIGH PLASTIC BONDING STRENGTH

(75) Inventor: Chin-Hsing Horng, Kueishan Hsiang (TW)

(73) Assignee: Yuan Deng Metals Industrial Co., Ltd., Kueishan Hsiang, Taoyuan (TW)

( * ) Notice: Subject to any disclaimer, the term of this patent is extended or adjusted under 35 U.S.C. 154(b) by 1370 days.

This patent is subject to a terminal disclaimer.

(21) Appl. No.: 12/511,066

(22) Filed: Jul. 29, 2009

(65) Prior Publication Data

US 2011/0027605 A1 Feb. 3, 2011

(51) Int. Cl.
*B21D 28/10* (2006.01)
*B32B 15/08* (2006.01)

(52) U.S. Cl.
CPC .................................. *B32B 15/08* (2013.01)
USPC .............................. 428/601; 428/596; 72/325

(58) Field of Classification Search
CPC ............... F16B 15/003; F16B 15/0038; F16B 15/0046; B21D 28/10
USPC ............................ 428/573, 574, 575, 596, 601
See application file for complete search history.

(56) References Cited

U.S. PATENT DOCUMENTS

| | | | | |
|---|---|---|---|---|
| 4,023,613 A | * | 5/1977 | Uebayasi et al. | 164/100 |
| 4,658,502 A | * | 4/1987 | Eckold et al. | 29/798 |
| 5,244,746 A | * | 9/1993 | Matsui et al. | 428/609 |
| 5,376,410 A | * | 12/1994 | MacKelvie | 427/290 |
| 5,678,946 A | * | 10/1997 | Enami | 403/282 |
| 5,813,117 A | * | 9/1998 | Natali | 29/874 |
| 6,286,465 B1 | * | 9/2001 | Hughes et al. | 122/18.31 |
| 6,591,457 B1 | * | 7/2003 | Howie, Jr. | 16/441 |
| 2004/0219810 A1 | * | 11/2004 | Nakai et al. | 439/153 |
| 2007/0062004 A1 | * | 3/2007 | Ramsauer | 16/370 |
| 2007/0125601 A1 | * | 6/2007 | Lutze | 182/222 |
| 2008/0034572 A1 | * | 2/2008 | Nanri | 29/527.6 |
| 2010/0243638 A1 | * | 9/2010 | Niederer et al. | 219/542 |
| 2011/0147370 A1 | * | 6/2011 | Bohlender | 219/553 |

* cited by examiner

*Primary Examiner* — Adam Krupicka

(57) ABSTRACT

A metal sheet member for insert molding with a plastic member is disclosed having a plurality of bonding portions arranged on the top wall thereof for enhancing the bonding strength of the plastic member to the metal sheet member, each bonding portion including a groove located on the top wall of the metal sheet member and a lug formed of a part of the metal sheet member and obliquely upwardly curved from one end of the groove.

9 Claims, 19 Drawing Sheets

METAL SHEET MEMBER HAVING HIGH PLASTIC BONDING STRENGTH

BACKGROUND OF THE INVENTION

1. Field of the Invention

The present invention relates to metal sheet members and more particularly, to a metal sheet member having high plastic bonding strength for the bonding of a plastic material.

2. Description of the Related Art

Following fast development of electronic industry, many advanced mobile electronic products (such as: intelligent cell phone, notebook, PDA, and etc.) are created having light, thin, short and small characteristics convenient for carrying. In order to reduce the weight while maintaining the advantages of metal appearance, a plastic member may be used with a metal sheet member for making a housing. The metal sheet member protects the product and facilitates coating. Conventionally, adhesive is usually used for the bonding between a metal sheet member and a plastic member. This method has drawbacks as follows:

1. When the adhesive is hardened, the volume of the adhesive will be reduced (fluid of the adhesive changed into vapor), causing gaps between the metal sheet member and the plastic member and lowering the yield rate.

2. Because the metal sheet member and the plastic member have different coefficients of thermal expansion, the metal sheet member may drop from the plastic member due to sharp temperature change. When an electronic product is distributing in different countries of different climate zones, metal sheet member disconnection problem may occur frequently.

3. When using an adhesive to bond a metal sheet member to a plastic member, it wastes much waiting time for the hardening of the adhesive, thereby prolonging the fabrication time. Further, the use of an adhesive greatly increases the cost of the electronic product, causing consumers not willing to buy the product.

SUMMARY OF THE INVENTION

The present invention has been accomplished under the circumstances in view. It is one object of the present invention to provide a metal sheet member, which has high plastic bonding strength for the bonding of a plastic member so that the plastic member molded thereon is prohibited from escaping.

To achieve this and other objects of the present invention, a metal sheet member has a plurality of bonding portions arranged on the top wall thereof for enhancing the bonding strength of a plastic member to the metal sheet member. Each bonding portion includes a groove located on the top wall of the metal sheet member, and a lug formed of a part of the metal sheet member and obliquely upwardly curved from one end of the groove.

DETAILED DESCRIPTION OF THE PREFERRED EMBODIMENT

Figure 1:
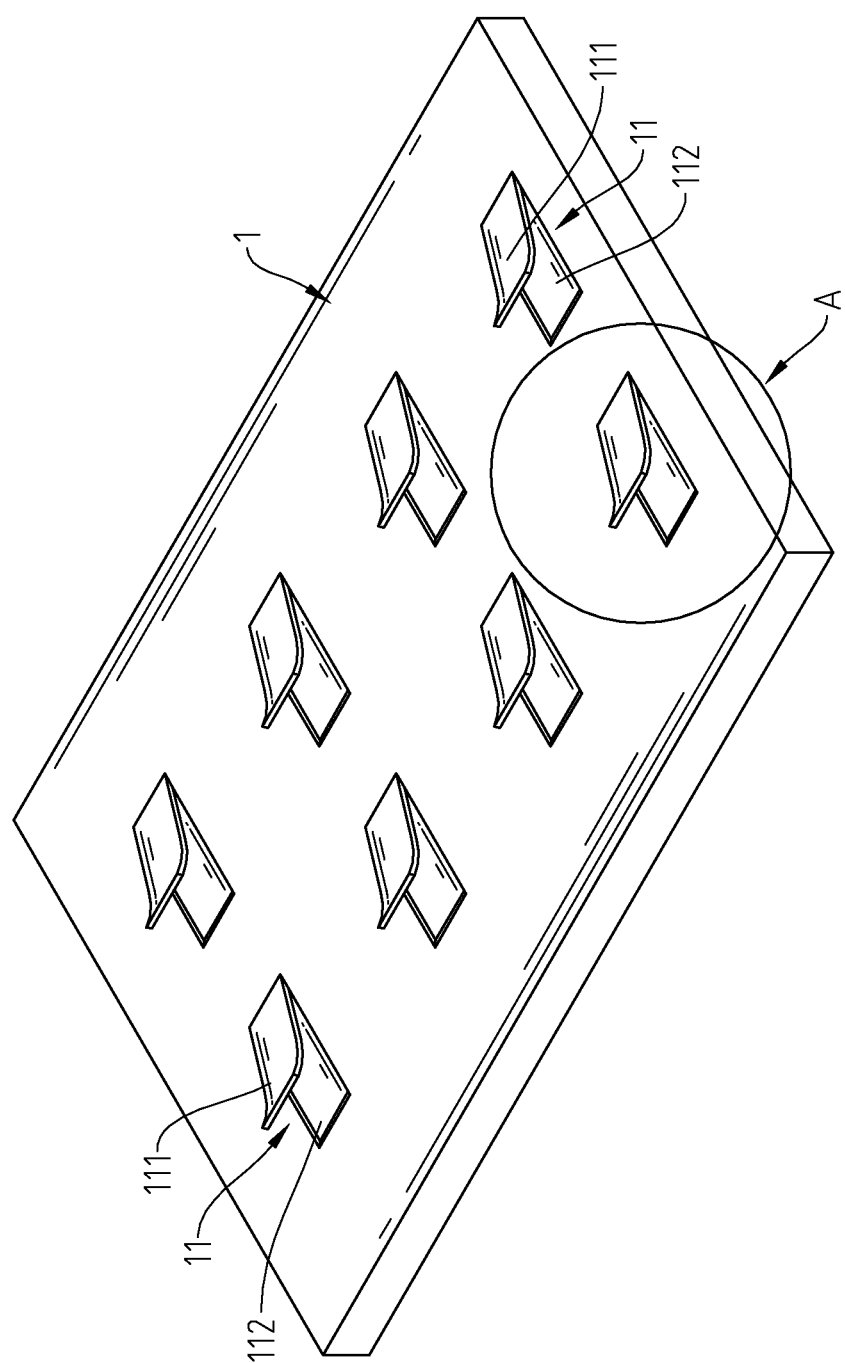
FIG. 1 is a perspective view of a metal sheet member constructed according to a first embodiment of the present invention.
Figure 2:
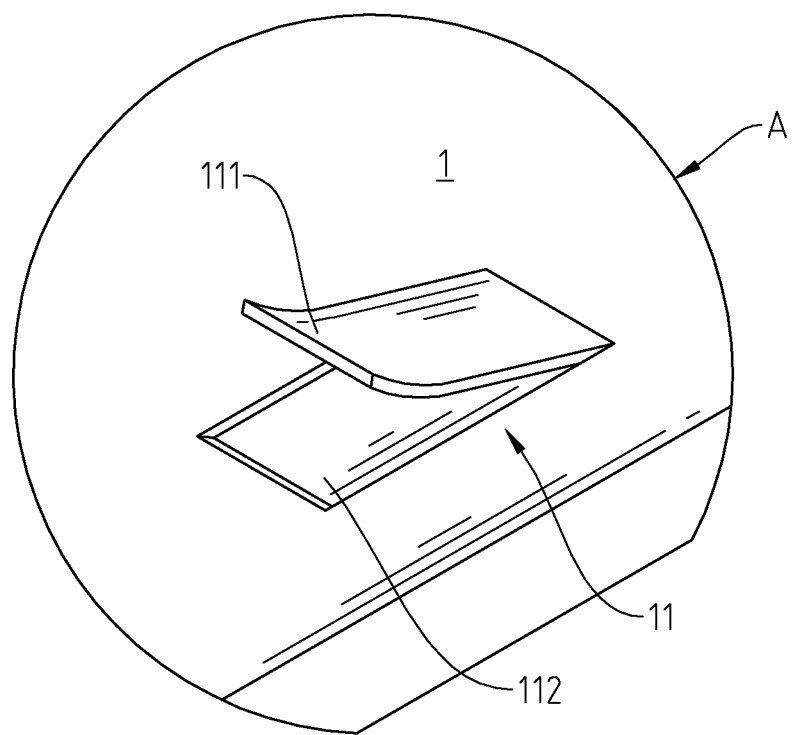
FIG. 2 is an enlarged view of part A of FIG. 1.

Referring to FIGS. 1 and 2, a metal sheet member 1 is shown having a plurality of bonding portions 11 arranged in an array. Each bonding portion 11 is formed of a groove 112 that is located on the top wall of the metal sheet member 1 and a lug 111 that is formed of a part of the metal sheet member 1 and obliquely upwardly curved from one end of the groove 112.

Figure 3:
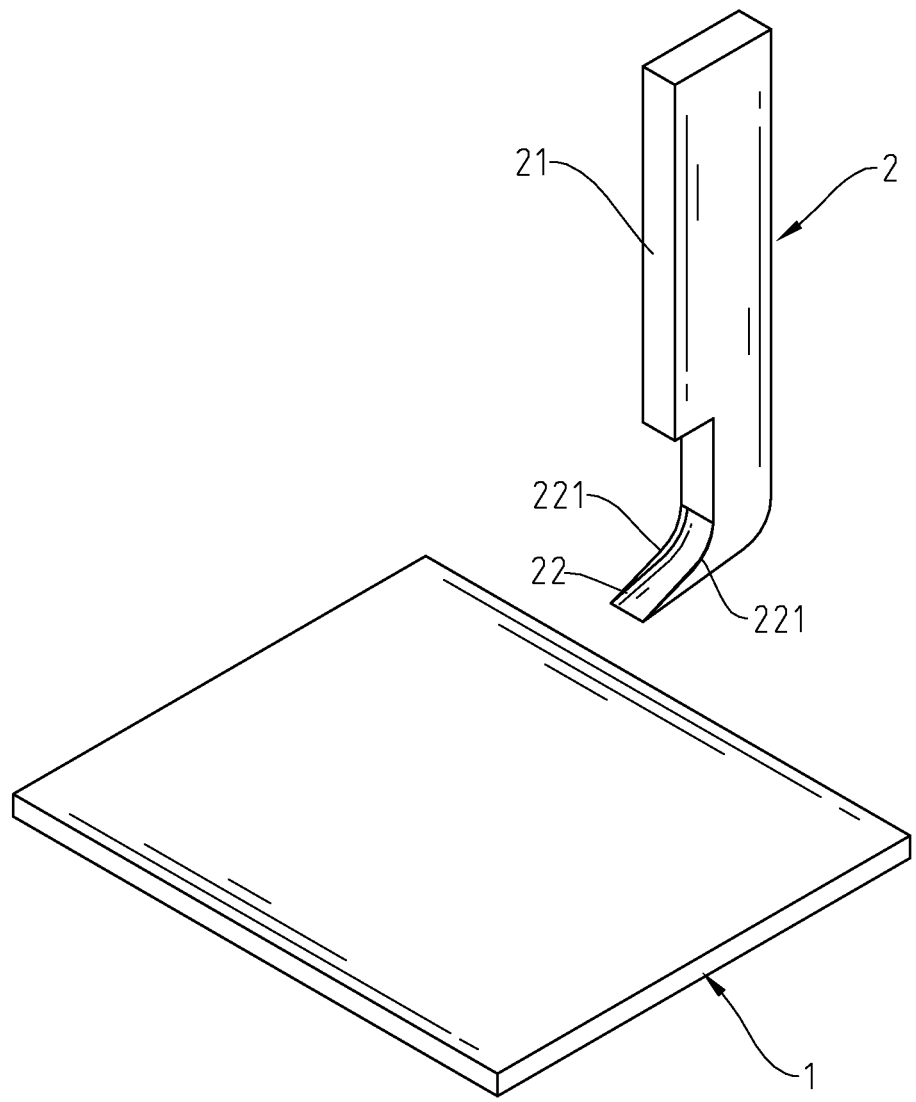
FIG. 3 shows the structure of a cutting tool for the processing of a metal sheet member according to the first embodiment of the present invention.
Figure 4:
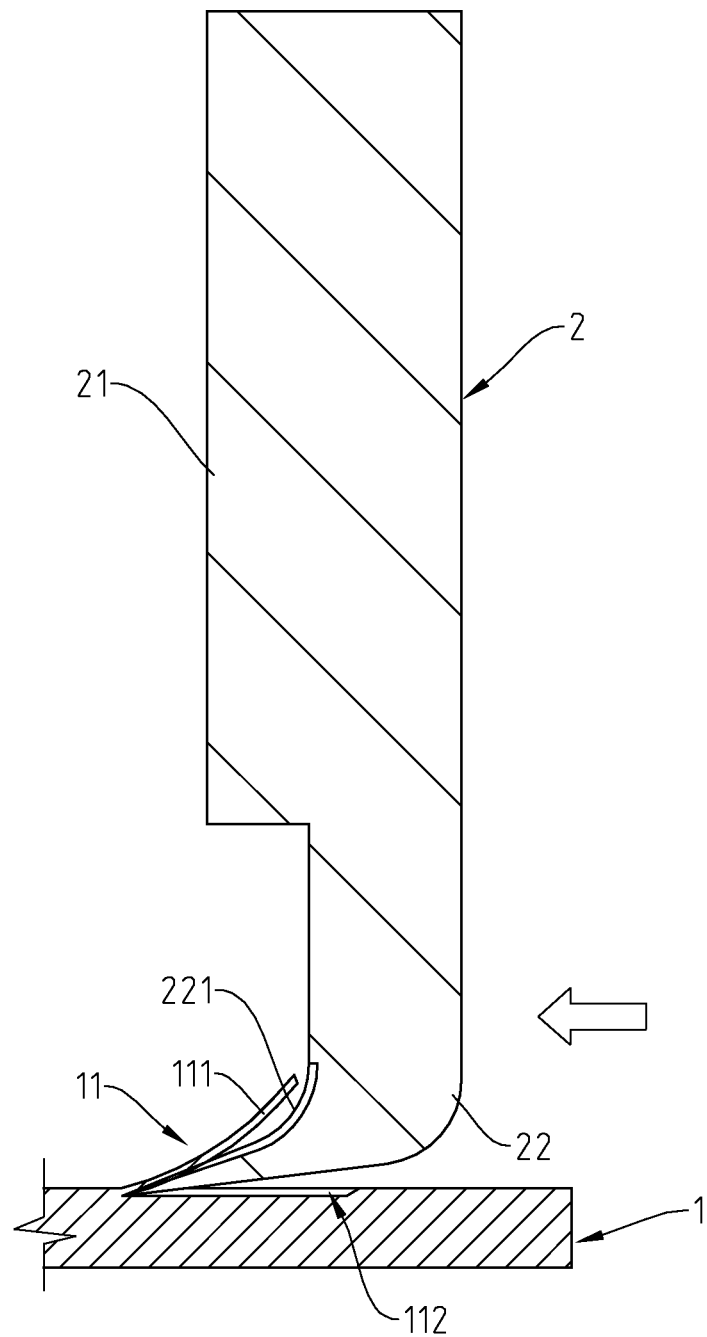
FIG. 4 is a schematic sectional side view, showing the processing of a metal sheet member according to the first embodiment of the present invention (I).
Figure 5:
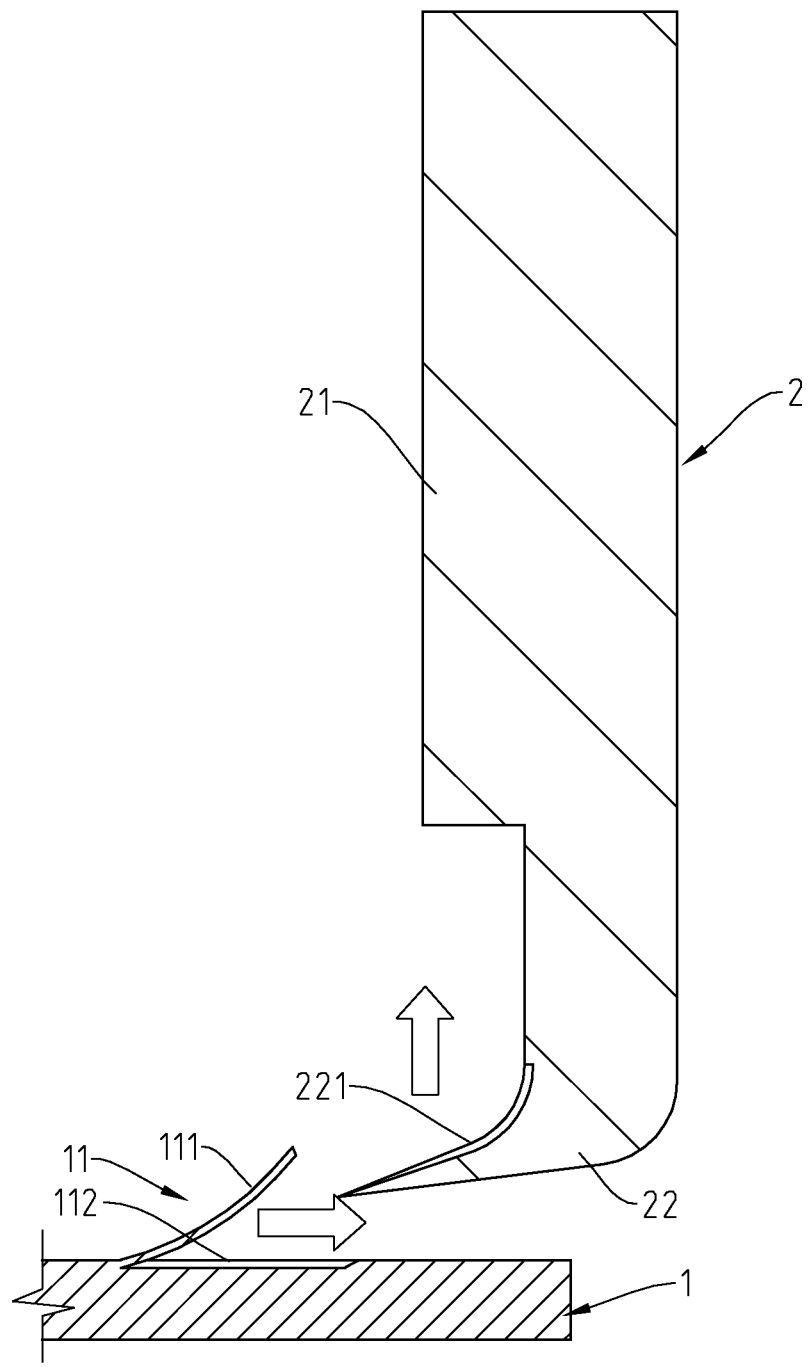
FIG. 5 is a schematic sectional side view, showing the processing of a metal sheet member according to the first embodiment of the present invention (II).

Referring to FIGS. 3~5 and FIGS. 1 and 2 again, a cutting tool 2 is shown having a handle 21 fastened to a machine (not shown) and a cutting tip 22 curved downwards and then obliquely forwards from the bottom side of the handle 21. The cutting tip 22 has two cutting edges 221 upwardly protruding from two opposite lateral sides of the bottom end thereof. The cutting tool 2 is driven by the machine to cut the metal sheet member 1 at selected locations, thereby forming the bonding portions 11. During operation, the machine is controlled to lower the cutting tool 2 to the top surface of the metal sheet member 1 and to have the cutting tip 22 be stopped against the top surface of the metal sheet member 1, thereafter the machine is controlled to move the cutting tool 2 forwards while giving a downward pressure to the cutting tool 2 against the metal sheet member 1. When moving the cutting tool 2 forwards at this time, the cutting tip 22 will be forced to cut into the metal sheet member 1 and to lift a thickness part of the metal sheet member 1 where the two cutting edges 221 cut off two opposite lateral sides of the lifted thickness part from the metal sheet member 1, thus one groove 112 is left in the top surface of the metal sheet member 1 and the lifted thickness part forms one respective lug 111 after a return stroke of the cutting tool 2. This operation procedure is repeated again and again, making the desired bonding portions 11 on the metal sheet member 1. The downward pressure applied to the cutting tool 2 against the metal sheet member 1 is properly controlled so that the cutting tip 22 is forced to cut into the metal sheet member 1 within a predetermined depth. After formation of the desired number of bonding portions 11, there is no any machined trace left on the bottom wall of the metal sheet member 1.

Figure 6:
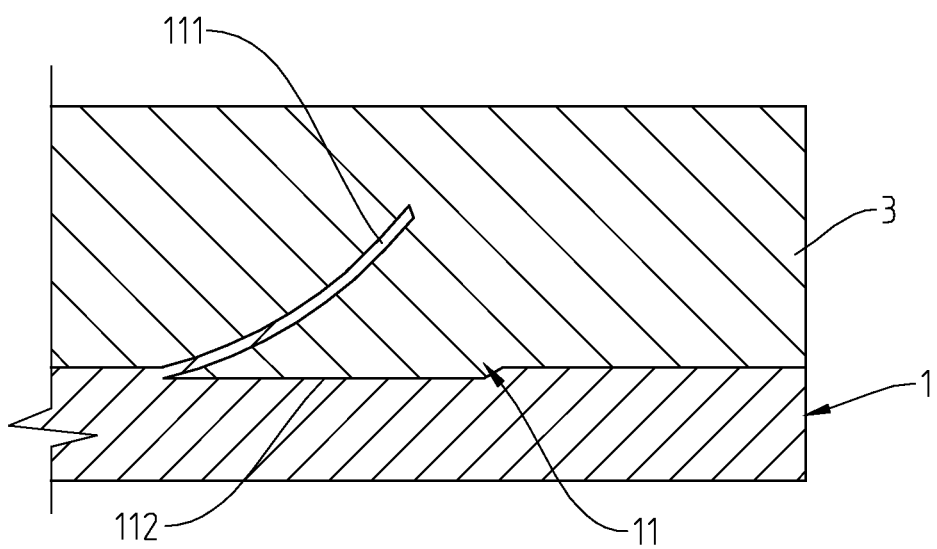
FIG. 6 is a sectional side view, showing a plastic member molded on the metal sheet member according to the first embodiment of the present invention.

Referring to FIG. 6, when molding a plastic member 3 on the metal sheet member 1 shown in FIG. 1 by insert molding, the plastic material covers the top surface of the metal sheet member 1 and enters the grooves 112 on the metal sheet member 1 to have the lugs 111 be embedded therein. After molding of the plastic member 3 on the metal sheet member 1, the lugs 111 are embedded in the plastic member 3 to secure the plastic member 3 to the metal sheet member 1 firmly, avoiding disconnection of the plastic member 3 from the metal sheet member 1.

Figure 7:
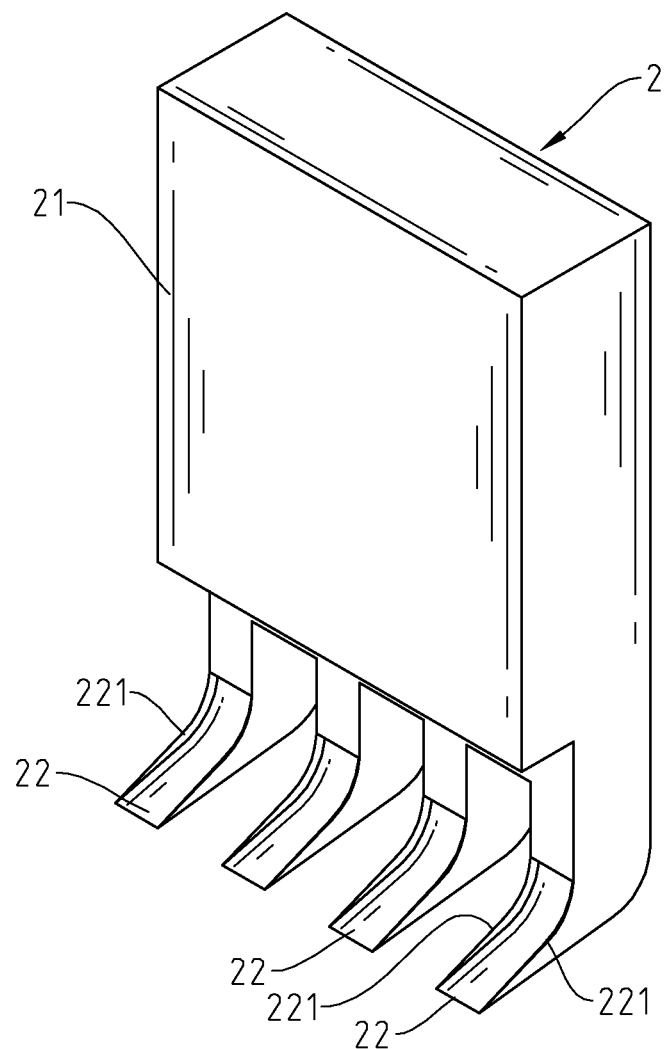
FIG. 7 is an elevational view of an alternate form of the cutting tool for the processing of a metal sheet member according to the first embodiment of the present invention.

Referring to FIG. 7 and FIG. 1 again, a cutting tool 2 can be made having a handle 21 for fastening to a machine (not shown) and a plurality of cutting tips 22 curved downwards and then obliquely forwards from the bottom side of the handle 21 and arranged in a parallel manner. Similar to the design shown in FIG. 3, each cutting tip 22 has two cutting edges 221 upwardly protruding from two opposite lateral sides of the bottom end thereof. Using this cutting tool 2 can make multiple bonding portions 11 on a metal sheet member 1 through one operation cycle.

Figure 8:
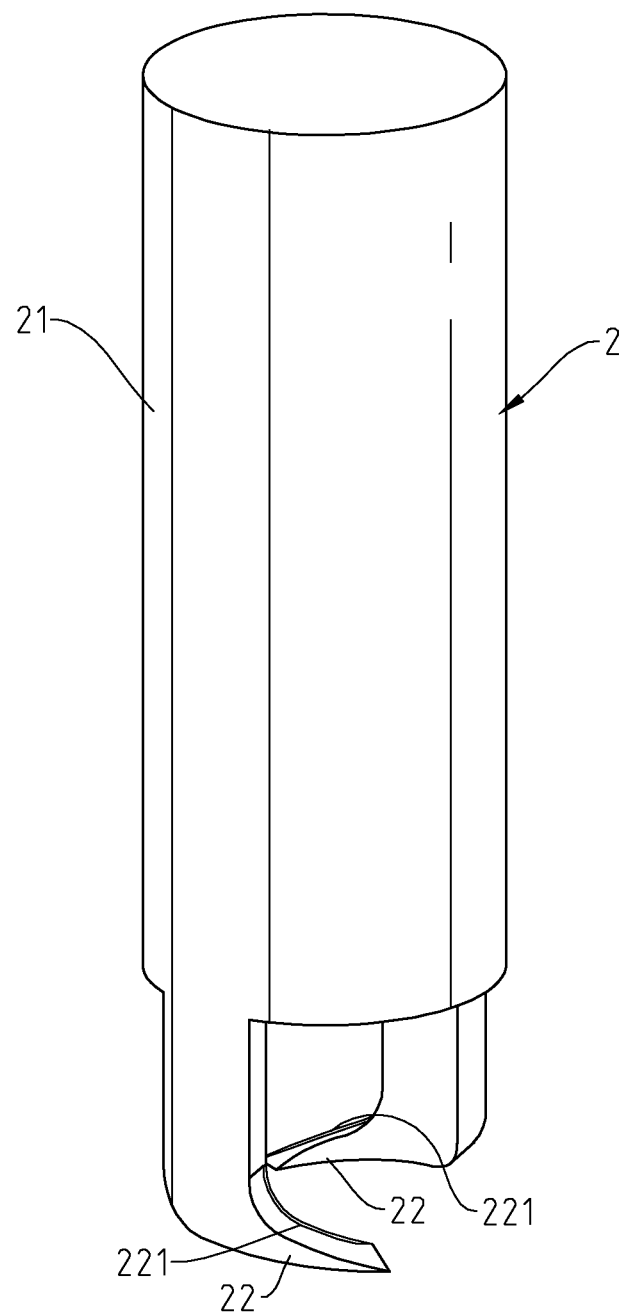
FIG. 8 is an elevational view of another alternate form of the cutting tool for the processing of a metal sheet member according to the first embodiment of the present invention.
Figure 9:
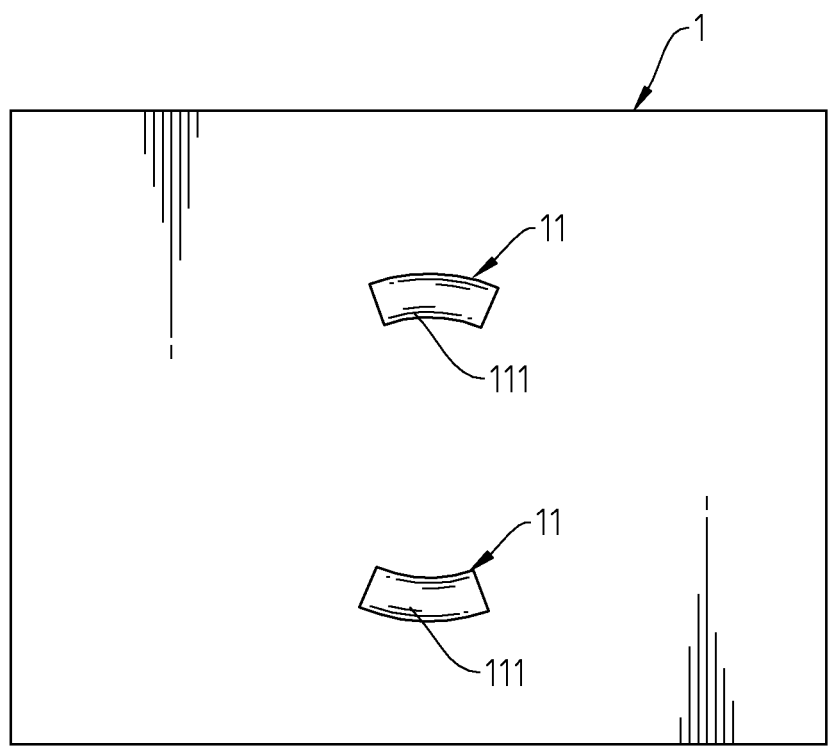
FIG. 9 is a schematic drawing showing bonding portions formed on a metal sheet member subject to the application of the cutting tool shown in FIG. 8.

Referring to FIGS. 8 and 9, a cutting tool 2 can be made having a handle 21 for fastening to a machine (not shown) and a plurality of cutting tips 22 curved downwards and then obliquely forwards from the bottom side of the handle 21 and equiangularly spaced from each other (or one another). During operation, the machine to which the cutting tool 2 is fastened is controlled to lower the cutting tool 2 to the top surface of the metal sheet member 1 and to have the cutting tip 22 be stopped against the top surface of the metal sheet member 1, thereafter the machine is controlled to rotate the cutting tool 2 while giving a downward pressure to the cutting tool 2 against the metal sheet member 1, thereby making a number of bonding portions 11 on the metal sheet member 1.

Figure 10:
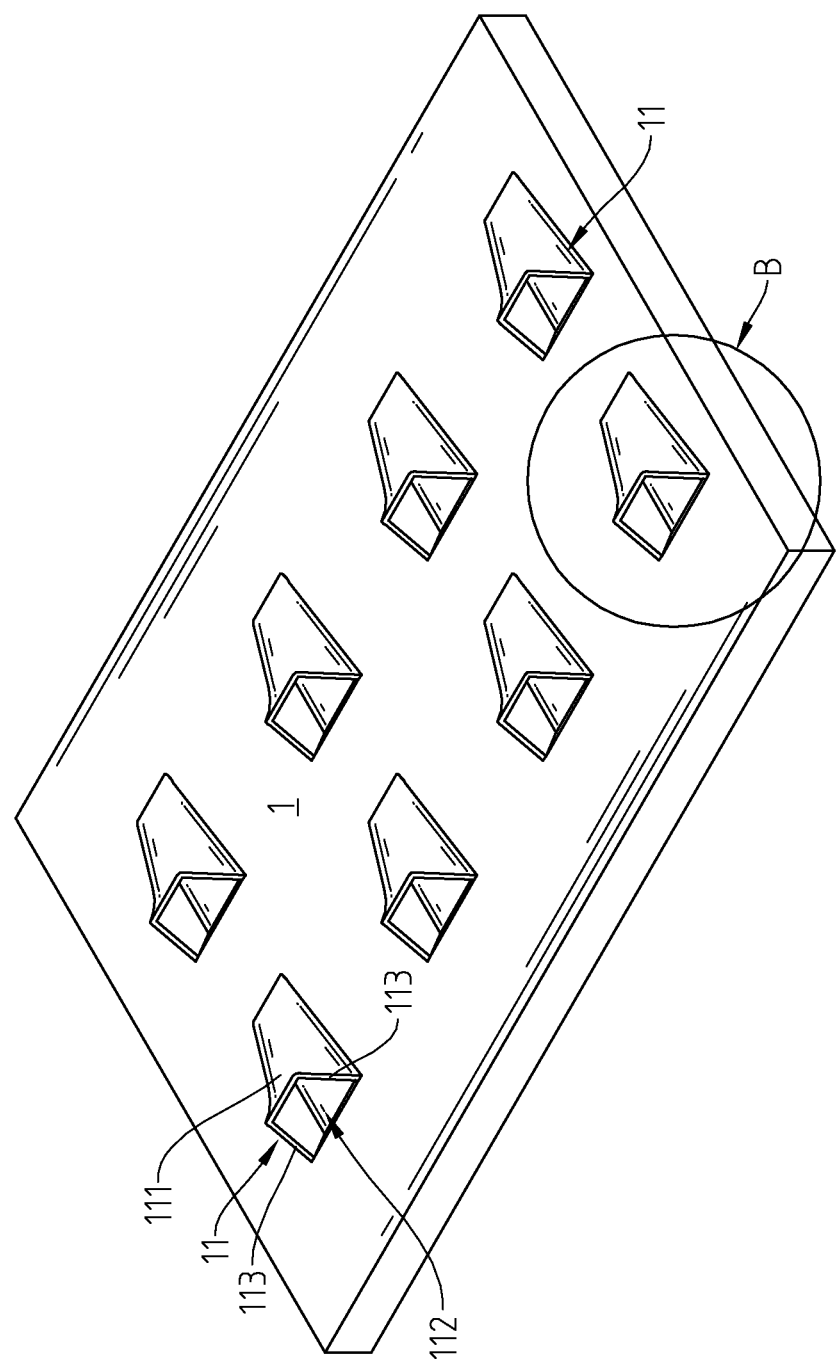
FIG. 10 is a perspective view of a metal sheet member constructed according to a second embodiment of the present invention.
Figure 11:
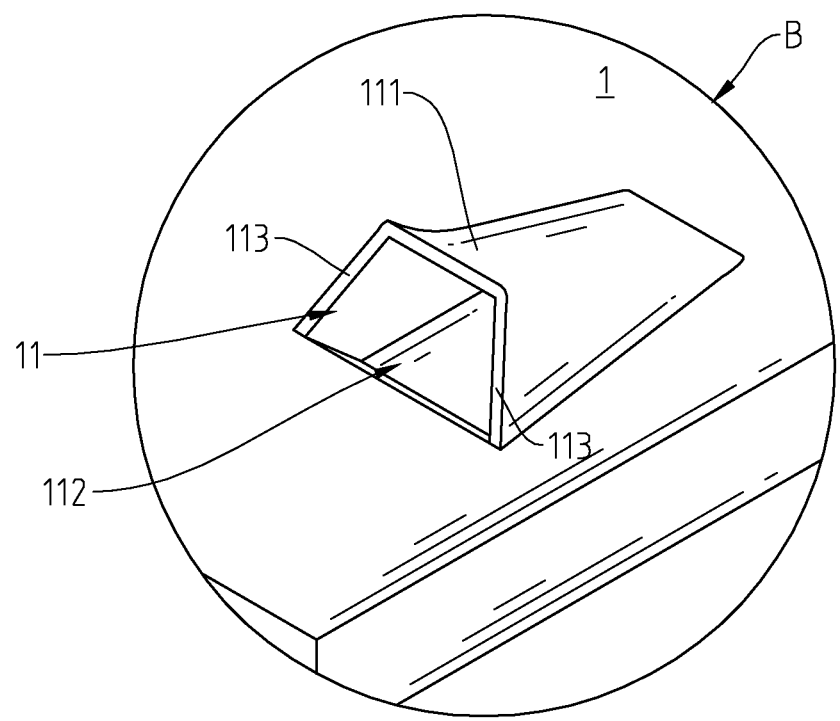
FIG. 11 is an enlarged view of part B of FIG. 10.

Referring to FIG. 10 and FIG. 11, a metal sheet member 1 is shown having a plurality of bonding portions 11 arranged in an array. Each bonding portion 11 is formed of a groove 112 that is located on the top wall of the metal sheet member 1, and a lug 111 that is formed of a part of the metal sheet member 1 and shaped like a shelter and obliquely upwardly curved from one end of the groove 112 and having two wings 113 respectively extended from two opposite lateral sides thereof and respectively connected to two opposite lateral sides of the groove 112.

Figure 12:
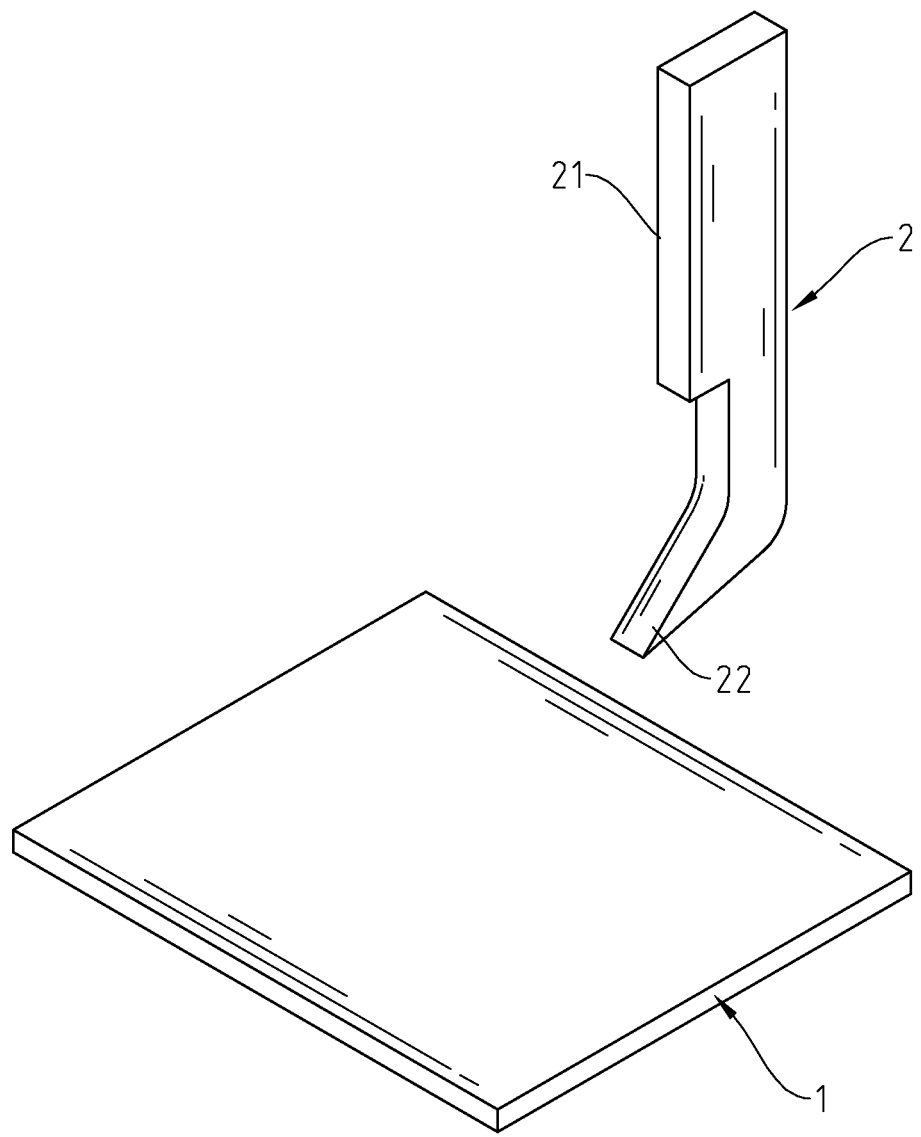
FIG. 12 shows the structure of a cutting tool for the processing of a metal sheet member according to the second embodiment of the present invention.
Figure 13:
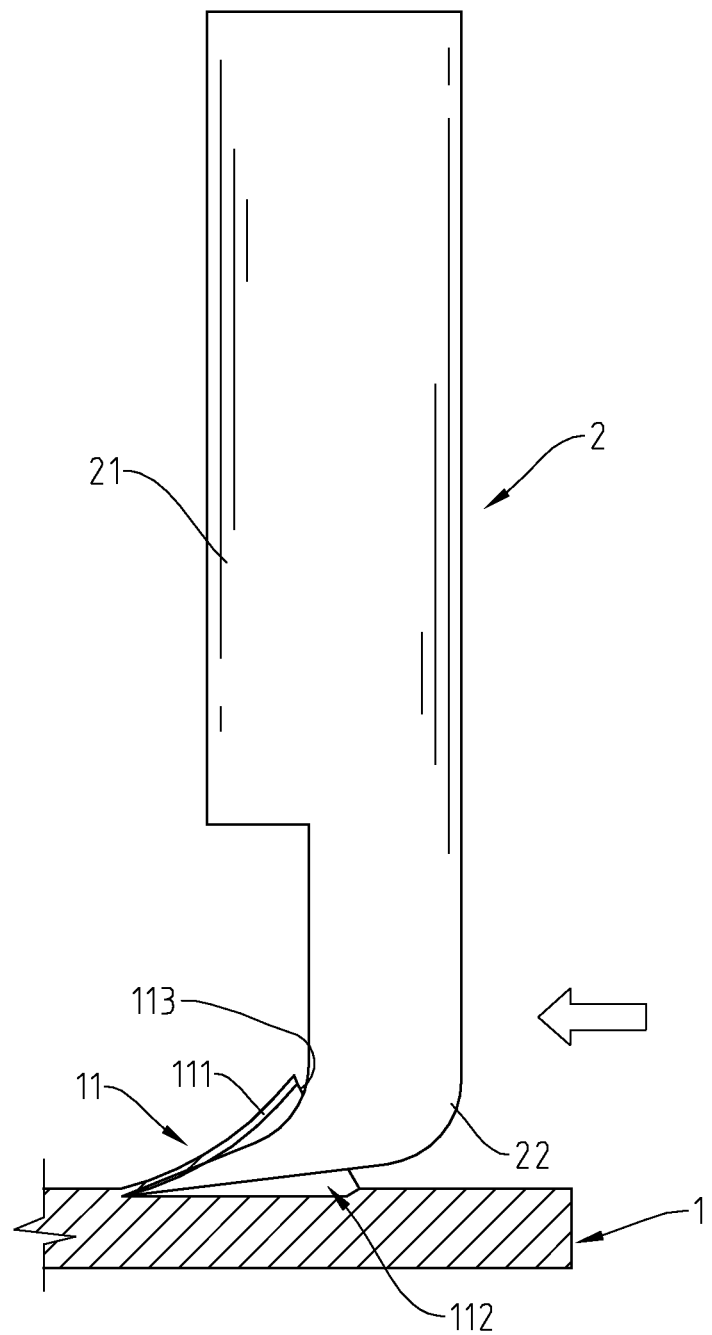
FIG. 13 is a schematic sectional side view, showing the processing of a metal sheet member according to the second embodiment of the present invention (I).
Figure 14:
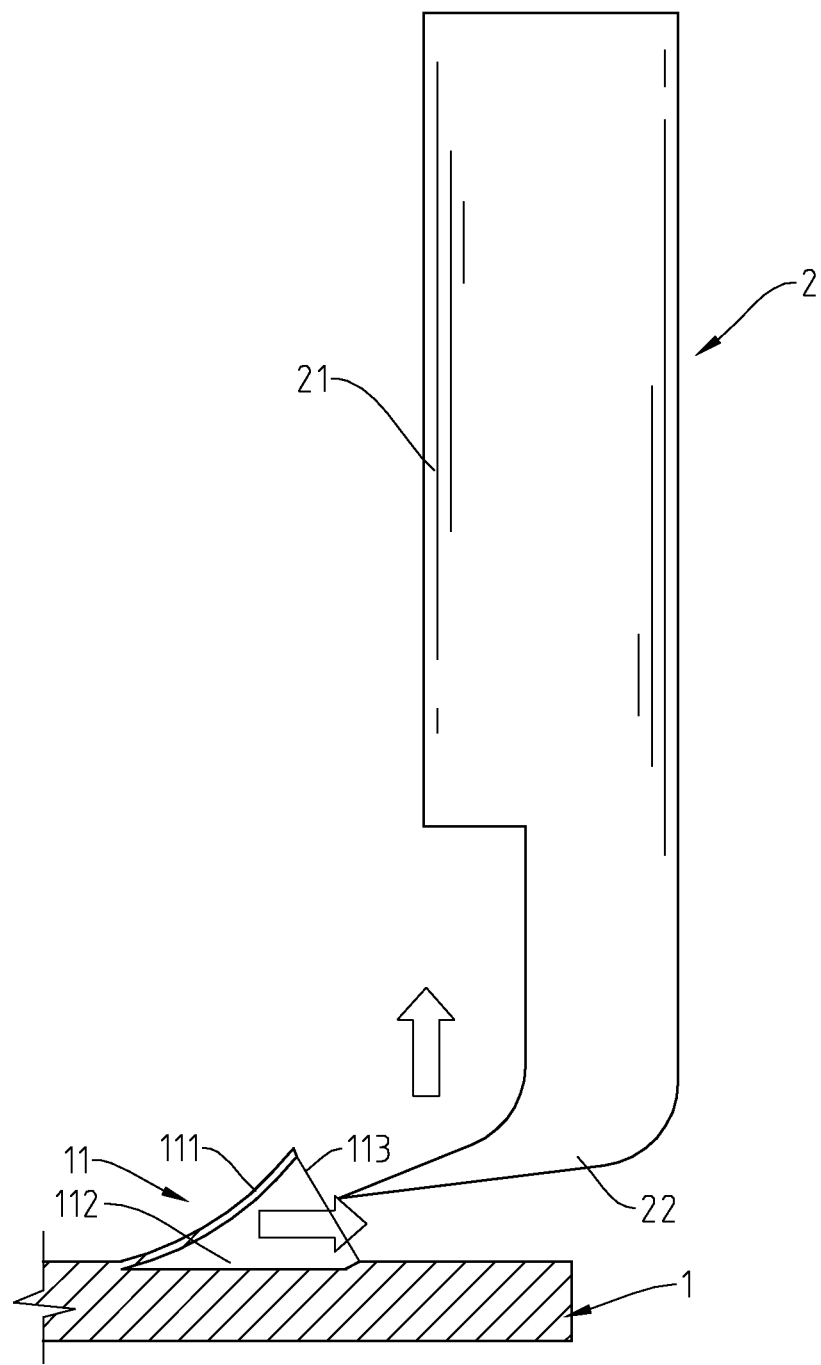
FIG. 14 is a schematic sectional side view, showing the processing of a metal sheet member according to the second embodiment of the present invention (II).

Referring to FIGS. 12~14, a cutting tool 2 for making bonding portions 11 on a metal sheet member 1 as shown in FIGS. 10 and 11 is shown having a handle 21 for fastening to a machine (not shown) and a cutting tip 22 curved downwards and then obliquely forwards from the bottom side of the handle 21. The cutting tool 2 is driven by the machine to cut the metal sheet member 1 at selected locations, thereby forming the bonding portions 11. During operation, the machine is controlled to lower the cutting tool 2 to the top surface of the metal sheet member 1 and to have the cutting tip 22 be stopped against the top surface of the metal sheet member 1, thereafter the machine is controlled to move the cutting tool 2 forwards while giving a downward pressure to the cutting tool 2 against the metal sheet member 1. When moving the cutting tool 2 forwards at this time, the cutting tip 22 will be forced to cut into the metal sheet member 1 and to lift a thickness part of the metal sheet member 1, thus one groove 112 is left in the top surface of the metal sheet member 1 and the lifted thickness part forms one respective lug 111 after a return stroke of the cutting tool 2. This operation procedure is repeated again and again, making the desired bonding portions 11 on the metal sheet member 1. Further, the downward pressure applied to the cutting tool 2 against the metal sheet member 1 is properly controlled so that the cutting tip 22 is forced to cut into the metal sheet member 1 within a predetermined depth. After formation of the desired number of bonding portions 11, there is no any machined trace left on the bottom wall of the metal sheet member 1.

Figure 15:
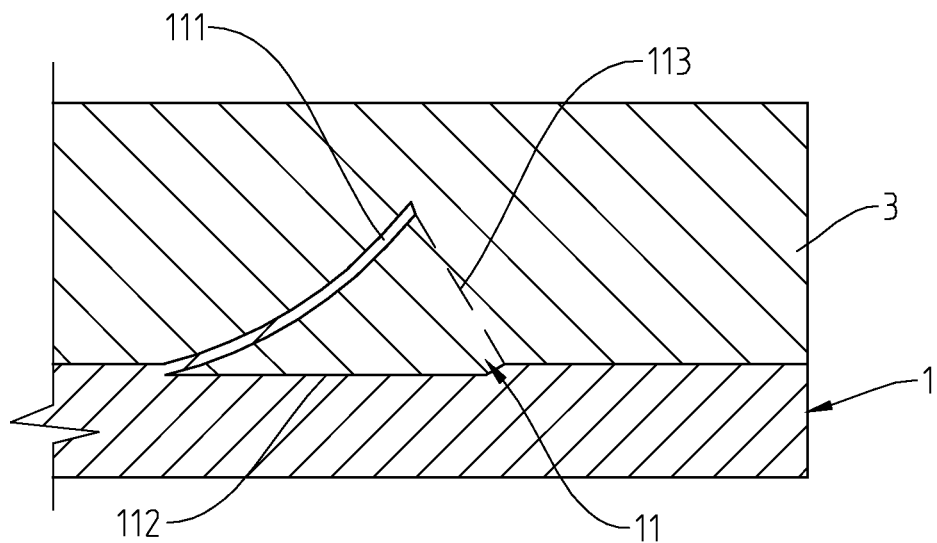
FIG. 15 is a sectional side view, showing a plastic member molded on the metal sheet member according to the second embodiment of the present invention.

Referring to FIG. 15, when molding a plastic member 3 on the metal sheet member 1 shown in FIG. 10 by insert molding, the plastic material covers the top surface of the metal sheet member 1 and enters the grooves 112 on the metal sheet member 1 and the space within each lug 111 and the associating wings 113 to have the lugs 111 and the associating wings 113 be embedded therein. After molding of the plastic member 3 on the metal sheet member 1, the lugs 111 and the associating wings 113 are embedded in the plastic member 3 to secure the plastic member 3 to the metal sheet member 1 firmly, avoiding disconnection of the plastic member 3 from the metal sheet member 1.

Figure 16:
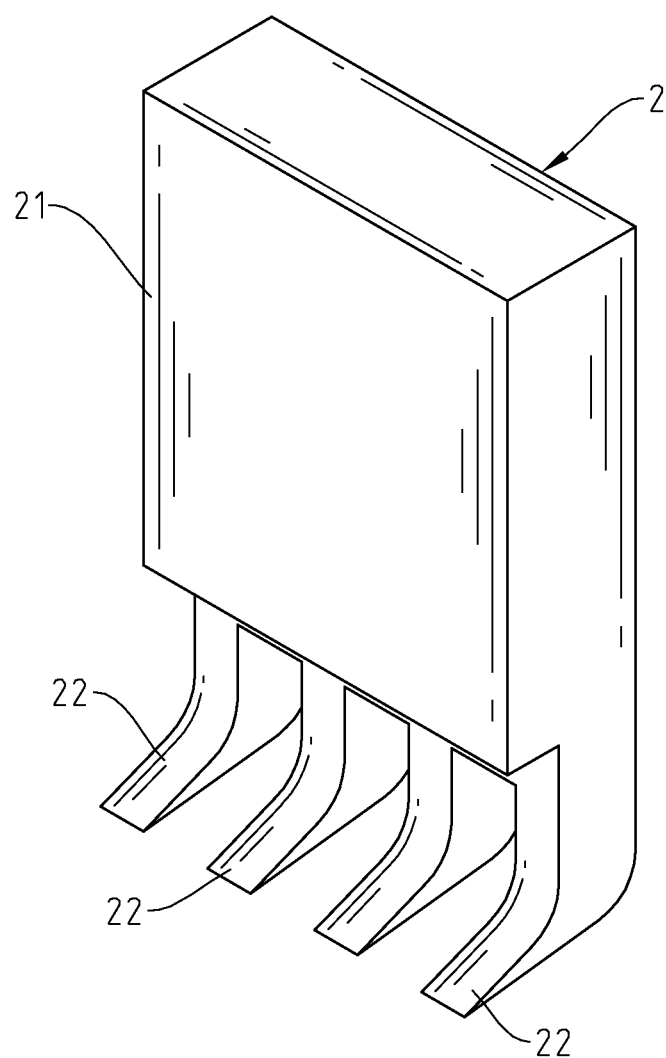
FIG. 16 is an elevational view of an alternate form of the cutting tool for the processing of a metal sheet member according to the second embodiment of the present invention.

Referring to FIG. 16 and FIG. 10 again, a cutting tool 2 can be made having a handle 21 for fastening to a machine (not shown) and a plurality of cutting tips 22 curved downwards and then obliquely forwards from the bottom side of the handle 21 and arranged in a parallel manner. Using this cutting tool 2 can make multiple bonding portions 11 on a metal sheet member 1 through one operation cycle.

Figure 17:
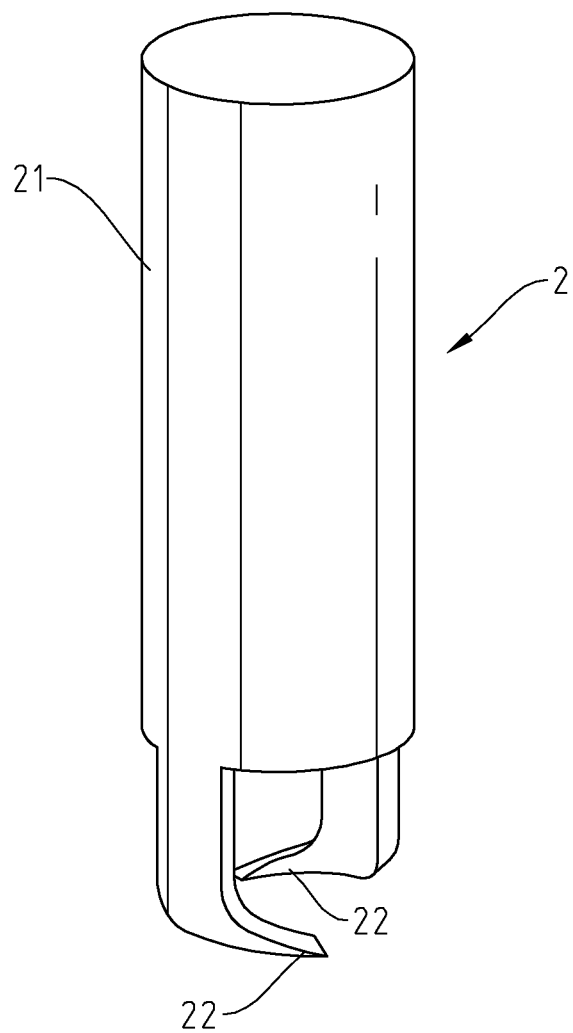
FIG. 17 is an elevational view of another alternate form of the cutting tool for the processing of a metal sheet member according to the second embodiment of the present invention.
Figure 18:
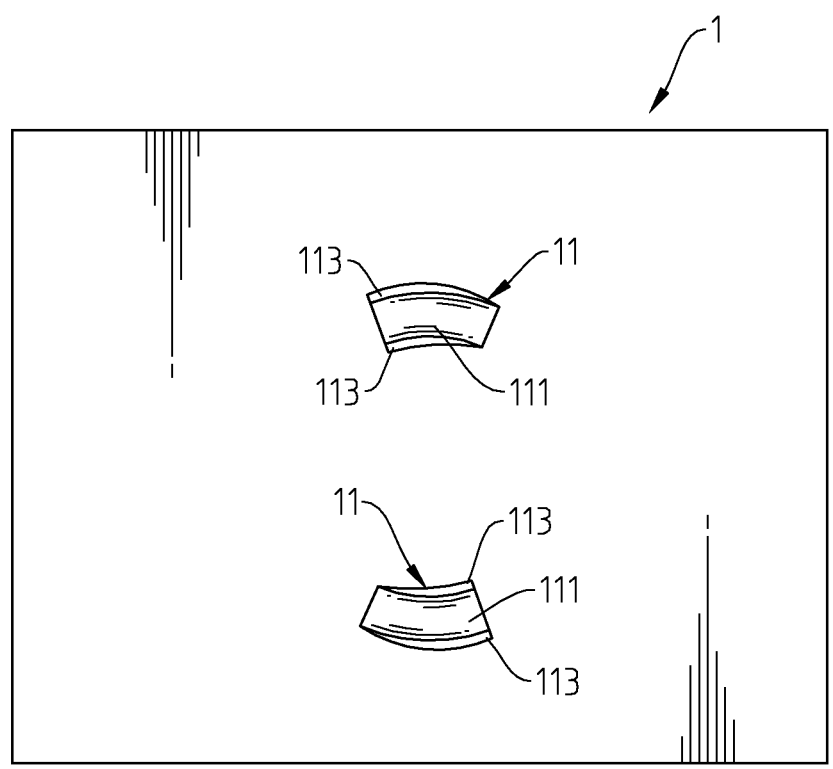
FIG. 18 is a schematic drawing showing bonding portions formed on a metal sheet member subject to the application of the cutting tool shown in FIG. 17.

Referring to FIGS. 17 and 18, a cutting tool 2 can be made having a handle 21 for fastening to a machine (not shown) and a plurality of cutting tips 22 curved downwards and then obliquely forwards from the bottom side of the handle 21 and equiangularly spaced from each other (or one another). Each cutting tip 22 has the same design as that shown in FIG. 12. During operation, the machine to which the cutting tool 2 is fastened is controlled to lower the cutting tool 2 to the top surface of the metal sheet member 1 and to have the cutting tip 22 be stopped against the top surface of the metal sheet member 1, thereafter the machine is controlled to rotate the cutting tool 2 while giving a downward pressure to the cutting tool 2 against the metal sheet member 1, thereby making a number of bonding portions 11 on the metal sheet member 1 wherein each bonding portion 11 is formed of a groove 112 that is located on the top wall of the metal sheet member 1, and a lug 111 that is formed of a part of the metal sheet member 1 and shaped like a shelter and obliquely upwardly curved from one end of the groove 112 and having two wings 113 respectively connected to two opposite lateral sides of the groove 112.

Figure 19:
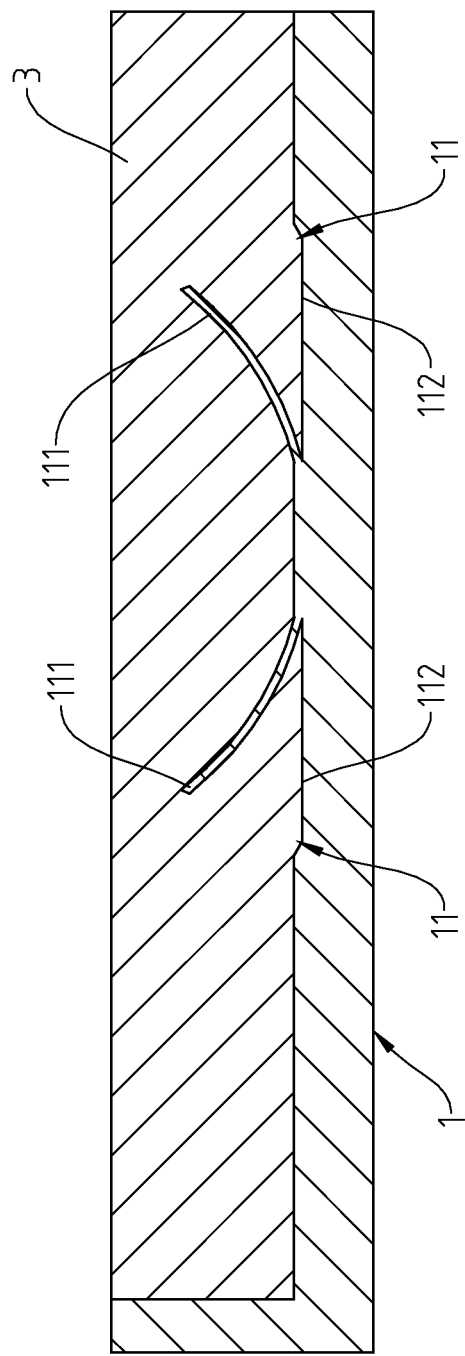
FIG. 19 is a sectional side view, showing lugs protruded from a metal sheet member in different directions and a plastic member molded on the metal sheet member according to the present invention.

Referring to FIG. 19, a metal sheet member 1 can be made having the lugs 111 of the bonding portions 11 thereof extend in different directions. After molding of a plastic member 3 on the metal sheet member 1 by insertion molding, the lugs 111 are embedded in the plastic member 3 in different directions. In case the volume of the plastic member 3 is changed due to a severe temperature change, the lugs 111 secures the plastic member 3 firmly to the metal sheet member 1, avoiding disconnection of the plastic member 3 from the metal sheet member 1.

In view of the foregoing, the invention overcomes the prior art technical shortcomings and drawbacks subject to the following technical features:

1. By means of the bonding portions 11 at the top side of the metal sheet member 1, the plastic member 3 that is molded on the metal sheet member 1 by insert molding is firmly secured to the metal sheet member 1, i.e. the bonding portions 11 enhance the bonding strength of the plastic member 3 to the metal sheet member 1, avoiding disconnection of the plastic member 3 from the metal sheet member 1.

2. The invention uses a cutting tool 2 to cut the metal sheet member 1 directly for making the desired bonding portions 11 without the use of any other materials, thereby facilitating the fabrication and saving the manufacturing cost.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A metal sheet member for insert molding with a plastic member, having a plurality of bonding portions arranged on a top wall thereof for enhancing the bonding strength of the plastic member to the metal sheet member, each said bonding portion comprising a groove located on the top wall of said metal sheet member that does not pass through said metal sheet member, and a lug formed of a part of said metal sheet member and upwardly oriented from an end of said groove, each said bonding portion having two wings respectively extending from two opposite lateral sides of the lug to two opposite lateral sides of the associated groove.

2. The metal sheet member as claimed in claim 1, wherein said bonding portions are formed of a part of said metal sheet member by means of operating a cutting tool to cut said metal sheet member, said cutting tool comprising a handle and a cutting tip curved downwards and then obliquely forwards from a bottom side of said handle.

3. The metal sheet member as claimed in claim 1, wherein said bonding portions are formed of a part of said metal sheet member by means of operating a cutting tool to cut said metal sheet member, said cutting tool comprising a handle and a plurality of cutting tips curved downwards and then obliquely forwards from a bottom side of said handle and equiangularly spaced from one another at a predetermined pitch.

4. The metal sheet member as claimed in claim 1, wherein said bonding portions are formed of a part of said metal sheet member by means of operating a cutting tool to cut said metal sheet member, said cutting tool comprising a handle and a plurality of cutting tips curved downwards and then obliquely forwards from a bottom side of said handle and arranged in parallel.

5. A method of forming a metal sheet member with a plastic member, comprising:
   utilizing a cutting tool to form both a groove on a top surface of the metal sheet member that does not pass through the metal sheet member and a lug formed from a part of said metal sheet member and upwardly extending from an end of said groove, with two wings respectively extending from two opposite lateral sides of the lug to two opposite lateral sides of the groove; and
   performing a molding process to form a plastic member on the top surface, the lug disposed within the plastic member.

6. The method as claimed in claim 5, wherein said cutting tool comprises a handle and a cutting tip curved downwards and then tapering forwards from a bottom side of said handle, said cutting tip having two cutting edges upwardly protruding from two opposite lateral sides of a bottom end thereof.

7. The method as claimed in claim 5, wherein said cutting tool comprises a handle and a plurality of cutting tips curved downwards and then tapering forwards from a bottom side of said handle and equiangularly spaced from one another at a predetermined pitch, each said cutting tip having two cutting edges upwardly protruding from two opposite lateral sides of a bottom end thereof.

8. The method as claimed in claim 5, wherein said cutting tool comprises a handle and a plurality of cutting tips curved downwards and then tapering forwards from a bottom side of said handle and arranged in parallel, each said cutting tip having two cutting edges upwardly protruding from two opposite lateral sides of a bottom end thereof.

9. The method as claimed in claim 5, wherein said cutting tool comprises a handle and a cutting tip curved downwards and then tapering forwards from a bottom side of said handle.

* * * * *